US012181131B2

(12) United States Patent
Hildebrand

(10) Patent No.: US 12,181,131 B2
(45) Date of Patent: Dec. 31, 2024

(54) ADJUSTABLE OPTICAL SYSTEM FOR LIGHTING UNITS

(71) Applicant: ZUMTOBEL LIGHTING GMBH, Lemgo (DE)

(72) Inventor: Benjamin Hildebrand, Lage (DE)

(73) Assignee: Zumtobel Lighting GmbH, Lemgo (DE)

( * ) Notice: Subject to any disclaimer, the term of this patent is extended or adjusted under 35 U.S.C. 154(b) by 0 days.

(21) Appl. No.: 18/548,269

(22) PCT Filed: Mar. 22, 2022

(86) PCT No.: PCT/EP2022/057503
§ 371 (c)(1),
(2) Date: Aug. 29, 2023

(87) PCT Pub. No.: WO2022/200356
PCT Pub. Date: Sep. 29, 2022

(65) Prior Publication Data

US 2024/0117956 A1 Apr. 11, 2024

(30) Foreign Application Priority Data

Mar. 25, 2021 (DE) ..................... 20 2021 101 565.9

(51) Int. Cl.
*F21V 17/02* (2006.01)
*F21S 8/06* (2006.01)
(Continued)

(52) U.S. Cl.
CPC .............. *F21V 17/02* (2013.01); *F21S 8/066* (2013.01); *F21V 5/008* (2013.01); *F21V 14/06* (2013.01); *F21Y 2115/10* (2016.08)

(58) Field of Classification Search
CPC .......... F21V 17/02; F21V 5/008; F21V 14/06; F21S 8/066; F21Y 2115/10
See application file for complete search history.

(56) References Cited

U.S. PATENT DOCUMENTS 4,187,534 A * 2/1980 Tichenor ................. F21V 17/02 362/268
6,244,730 B1 * 6/2001 Goldberg ................ F21V 17/20 362/268
(Continued)

FOREIGN PATENT DOCUMENTS

JP 2015062187 4/2015

OTHER PUBLICATIONS

PCT/EP2022/057503, International Search Report and Written Opinion dated May 31, 2022, 7 pages.

*Primary Examiner* — Mary Ellen Bowman
(74) *Attorney, Agent, or Firm* — Andrus Intellectual Property Law, LLP

(57) ABSTRACT

The invention relates to an optical system (2) for lighting units (S), having: an optical support (3) which extends linearly along a longitudinal axis (A) between a light inlet opening (LE) and a light outlet opening (LA) and which delimits a receiving area (R) for receiving optical elements (4, 5) between the openings (LE, LE), wherein an inner wall (30) of the optical support (3) facing the receiving area (R) has at least two structural sections (31), which are axially offset to each other with respect to the longitudinal axis (A), for releasably mounting a respective optical element (4, 5) in the receiving area (R).

25 Claims, 6 Drawing Sheets

(51) Int. Cl.

| | |
|---|---|
| ***F21V 5/00*** | (2018.01) |
| ***F21V 14/06*** | (2006.01) |
| ***F21Y 115/10*** | (2016.01) |

(56) References Cited

U.S. PATENT DOCUMENTS

| | | | | |
|---|---|---|---|---|
| 11,268,677 | B2 * | 3/2022 | Mei | F21V 14/02 |
| 2008/0137345 | A1 * | 6/2008 | Wimberly | F21V 14/02 362/368 |
| 2020/0370729 | A1 * | 11/2020 | Eidam | F21V 17/02 |

* cited by examiner

ADJUSTABLE OPTICAL SYSTEM FOR LIGHTING UNITS

CROSS-REFERENCE TO RELATED APPLICATION

The present application is the U.S. national stage application of international application PCT/EP2022/057503 filed Mar. 22, 2022, which international application was published on Sep. 29, 2022 as International Publication WO 2022/200356 A1. The international application claims priority to German Patent Application 20 2021 101 565.9, filed Mar. 25, 2021.

TECHNICAL FIELD OF THE INVENTION

The present invention relates to an optical system for lighting units with an optics carrier serving to receive optical elements, as well as a lighting system with a lighting unit and an optical system of the prescribed type placed thereon.

BACKGROUND OF THE INVENTION

In principle, lighting units and optics usable for this purpose are known. A defined light emission characteristic of the lighting unit is to be provided and possibly changed by means of the optics. In a simple variant, certain optical elements, such as lenses and associated diffuser lenses, are fixedly mounted at different fixed distances from the light source in order to obtain a desired light pattern. In order to obtain different light pattern, a different optics must be used in this case.

However, solutions are also known in which the optical elements are provided that are adjustable with respect to the light source. To this end, any complex solutions for electrical or mechanical adjustment of the optical elements are known, which generally require the use of a new lighting unit which has this technology built in.

Therefore, solutions are known in which, for example, lenses and disks are mechanically installed at a fixed distance and cannot be changed. Known adjustable solutions are comparatively expensive and complex and, moreover, generally require providing a completely new lighting unit.

SUMMARY OF THE INVENTION

It is therefore an object of the present invention to provide a particularly simple optical system and a lighting system equipped therewith, which can be produced, mounted and/or adjusted in a simple and cost-effective manner, for setting or changing a desired light pattern.

This object is achieved by the subject matter of the independent claims. The dependent claims develop the central idea of the present invention in a particularly advantageous manner.

According to a first aspect, the present invention relates to an optical system for lighting units. Said optical system has an optics carrier or carrier housing. The optics carrier extends rectilinearly between a light inlet opening and a light outlet opening along a longitudinal axis. Preferably, the optics carrier is tubular or extends in a tubular manner and particularly preferably has a cylindrical shape. The optics carrier delimits a receiving space for receiving optical elements between the openings (i.e., the light inlet opening and the light outlet opening). An inner wall of the optics carrier facing the receiving space has at least two or a plurality of structural sections, which are arranged axially offset relative to each other with respect to the longitudinal axis, for releasably mounting a respective optical element in the receiving space.

By means of an optical system provided in this way, any desired light pattern can be generated using any selected optical elements. This is made possible in particular by the fact that any optical elements can be selectively inserted into the structural sections in any of the positions axially offset to each other. Since these structural sections are provided axially offset relative to each other along the longitudinal axis, any optical element or any combination of optical elements can thus be arranged at the desired axial distance from the light source or the lighting unit, and/or the optical elements can also be provided at any distance to each other based on the number of structural sections, i.e., arranged in series with one another. Depending on the optical elements used, it is thus possible, for example, to vary (reduce or widen) a beam angle (i.e., to achieve a zoom effect) and/or to selectively soften the sharpness of a light cone in the edge region to achieve a so-called “beam shaping” effect or to selectively make the edge region either more sharp-edged or more soft-edged by variously providing said optical elements along the longitudinal axis. Depending on the use of optical elements and the combination thereof, a wide variety of light patterns can thus be produced, while the design of the optical system overall is particularly simple and the provision thereof is cost-effective. Due to the releasable mounting of the optical elements, an adjustment of the light pattern can also be easily implemented, so that the handling of the optical system is particularly simple.

The structural sections can preferably each be provided circumferentially along the inner wall and preferably in a plane perpendicular to the longitudinal axis or extend accordingly. A secure positioning of an optical element can thus be achieved by correspondingly defined structural sections which are preferably clearly aligned with respect to the light emission direction.

The structural sections may have regions distributed circumferentially or extend continuously circumferentially. Thus, depending on requirements, a desired mount for the optical elements can be provided. While a circumferentially distributed arrangement of the structural sections requires a smaller amount of material and a smaller cover for the optical elements, a circumferentially continuous design of the structural sections allows for an optical element to be supported or mounted securely all around and ensures an overall robust design of the carrier housing.

The structural sections can each have groove sections extending around the longitudinal axis and open radially relative to the longitudinal axis in the direction of the receiving space. Thus, the optical elements can be securely inserted in a particularly simple manner in precisely these groove sections and thus be optimally mounted with respect to the longitudinal axis.

The groove sections can preferably be designed as ring grooves, which are preferably circumferentially continuous about the longitudinal axis. Ring grooves not only form a particularly secure and stable mount for the optical element, but also enable an intuitive fastening of the optical element for an operator. Particularly the circumferentially continuous design in turn increases the stability of the carrier housing overall, so that it can be designed, if necessary, with less material use due to the structuring, which in turn is reflected in a more cost-effective production.

The groove sections preferably widen radially with respect to the longitudinal axis and in the direction of the receiving space. In this way, secure insertion of the optical element into the groove sections is made possible. In addition, certain tolerances can be compensated for in this way both with respect to the longitudinal axis in the radial and in the axial direction. For example, a corresponding optical element to be received can be provided with a defined oversize, which is then inserted into the outwardly tapered groove sections and thus pressed in and thereby held securely.

The structural sections can be provided equidistantly at least in part along the longitudinal axis. Consequently, the optical elements can be arranged in defined fixed and preferably uniform increments spaced at different distances as desired from the light inlet opening or the light outlet opening and thus can be arranged in a lighting unit equipped with the optical system. This is particularly advantageous in an optical system with a plurality of structural sections, since a light emission characteristic can thus preferably be adapted linearly.

The optics carrier can have a round or polygonal cross section when viewed in the direction of the longitudinal axis. The round design enables particularly simple manufacture. With correspondingly configured optical elements, a polygonal cross section can serve, for example, to prevent a rotation of said optical elements relative to the carrier housing. This can also be advantageous for aesthetic reasons. In addition, the grip of the carrier housing can be increased by a polygonal cross-sectional shape. The carrier housing itself can also preferably be received in a rotationally secure manner with respect to further components, as is described below by way of example with regard to a system housing.

As already mentioned, the optics carrier can preferably be tubular or cylindrical. Thus, the optics carrier has a simple design with functionally high flexibility.

The optics carrier and at least its inner wall can be mirror-symmetrical with respect to a mirror plane having the longitudinal axis. This is advantageous in terms of production. A simple and clear design can thus also be provided, which in turn enables intuitive operation of the optical system.

The optics carrier can preferably be composed of (at least) two sub-elements. The sub-elements are particularly preferably (at least) two half-shell elements. A separation plane of these sub-elements preferably has the longitudinal axis. A particularly simple construction of the carrier housing can thus be provided. Providing the carrier housing in separable sub-elements additionally enables a particularly simple insertion of the optical elements into the open optics carrier, which is then closed in a particularly simple manner by joining these two sub-elements. A separable or detachable design and function of the sub-elements enables a simple insertion and/or changing of the optical elements at any time, in that the receiving space and thus the structural sections can be easily exposed by this separation.

The sub-elements can particularly preferably be identical. The use of identical parts in turn has an advantageous effect on a cost-effective production of the same. This way, only one tool is required for producing the entire carrier housing. An incorrect installation can thus also be avoided.

The sub-elements can each have coupling structures for connecting the sub-elements to each other. The connection is preferably releasable. The connection can also preferably take place without tools. By providing the preferably integral coupling structures, a simple and robust connection of the sub-elements can be provided. Since these are also preferably provided outside the receiving space, they collide neither with the structural sections nor with any optical elements to be received. Moreover, the coupling structures are thus outside a light passage path so that they do not have a negative effect on the light pattern, for example, by shadowing. In a particularly preferred embodiment, the coupling structures can also be provided on the end face in connection regions of the sub-elements located in the separation plane, so that, in the assembled state, they are provided completely hidden. Preferably, however, the coupling structures are provided on an outer wall of the carrier housing facing away from the receiving space. Thus, they are not only easy to produce, but also constitute a secure and robust connection of the sub-elements, since they can be arbitrarily designed.

The sub-elements can be connected to each other in an articulated manner about a pivot axis via an articulated section for pivoting the sub-elements relative to each other and thus selectively expose the receiving space for inserting the optical elements into the structural sections. Such an articulated section enables a captive handling of the sub-elements. Furthermore, a defined positioning of the sub-elements relative to each other is automatically provided. Overall, handling during assembly or adjustment of the light pattern is thus simplified.

In a particularly preferred embodiment, the coupling structures can have the articulated section (or vice versa). For this purpose, the coupling structures can be designed such that they are provided on the carrier housing or the sub-elements, for example, on two opposing sides, viewed with respect to the longitudinal axis. If the coupling structure is detached on one of the sides, while it is maintained on the other side, the coupling structure can be used as an articulated section on this other side. For example, a sub-element in a coupling structure has a projection (e.g., pin) extending parallel to the longitudinal axis and the counterpart of the coupling structure on the other sub-element has a recess (e.g., blind hole or through opening) extending along the longitudinal axis, into which the pin is preferably releasably inserted. In a particularly preferred embodiment, two coupling structures can be provided axially offset, as viewed along the longitudinal axis, on each side of the carrier housing, which coupling structures have projections which protrude in opposite directions or project toward one another and engage in correspondingly provided (that is to say, for example, directed toward or away from one another) recesses. Thus, an overall secure coupling of the sub-elements can be provided, while at the same time the coupling structure can be selectively used as an articulated section in a particularly simple manner.

The pivot axis particularly preferably extents parallel to the longitudinal axis. A particularly simple pivoting of the sub-elements can thus be made possible. This is given in particular when, as described above, the coupling structures have the articulated section.

The optics carrier or its sub-elements can be produced as an injection-molded part. The optics carrier can thus be provided in a particularly simple manner. In particular, the variant of the optics carrier that is separated into two or more sub-elements makes a particularly simple manufacture possible here, since the demolding of these components after the injection molding process is possible in a particularly simple manner and in a non-destructive manner with respect to the injection mold, inconnecting structure structural sections are designed as grooves. Thus, an overall cost-effective production of the carrier housing can be made possible.

The optical system can further have a system housing for receiving the optics carrier, which circumferentially surrounds the optics carrier on the outside. The optics carrier can thus be used as a type of cartridge which can be inserted into the system housing in a simple manner after receiving the optical elements in the desired structural sections. In the case of such an embodiment variant, additional coupling structures can optionally be dispensed with, since the optics carrier is preferably held together by the system housing.

The optics carrier can be inserted into the system housing along the longitudinal axis. Such an axial insertion enables a particularly simple and at the same time secure assembly of the optical system. A later adjustment of the light pattern by moving the optical elements can also be made possible in a simple manner in that the optics carrier is simply pulled out of the system housing, the optical elements are displaced, and the optics carrier is inserted again.

The system housing and the optics carrier or carrier housing may have corresponding connecting structures on the sides facing each other (i.e., the radially outward-facing side of the optics carrier and the radially inward-facing inner side of the system housing). These can preferably guide the housings relative to each other during insertion along the longitudinal axis or can guide the optics carrier relative to the system housing during insertion along the longitudinal axis. Further preferably, the connecting structures can be designed such that they prevent a rotation of the housings (that is, of the system housing and carrier housing or optics carrier) about the longitudinal axis relative to each other. A simple and secure installation with a defined alignment of the housings with respect to each other can thus be made possible. Incorrect assembly can also be avoided by designing the connecting structures accordingly, for example, by providing and/or designing the connecting structures asymmetrically so that only a specific arrangement, i.e., the circumferential orientation to each other with respect to the longitudinal axis, enables assembly.

The system housing may further have two retaining sections which retain the optics carrier axially therebetween and particularly preferably clamp the same. The retaining sections can preferably be provided at the axially opposing ends of the optics carrier, relative to the longitudinal axis. The retaining sections can preferably be webs projecting radially inward with respect to the longitudinal axis. For example, the respective retaining section may have an annular projection projecting radially inward. Thus, a particularly simple and cost-effective structure can be provided for secure positioning and mounting of the optics carrier in the system housing.

One of the retaining sections, preferably the retaining section facing the light outlet opening, can be releasably provided on/in the system housing. Thus, the optics carrier can be axially exposed in a simple manner, for example, by removing this releasable retaining section to remove the optics carrier for the purpose of adjusting the light pattern, for example. To a accomplish this, the releasably provided retaining section can be fastened, for example, by rotary movement; for this purpose, said retaining section may preferably have a corresponding screw or bayonet structure which is designed to correspond to a corresponding counter structure on the system housing side.

The optical system may further have an attachment which is preferably releasable and provided on the side facing the light outlet opening such that light emitted via the light outlet opening passes through the attachment for light emission of a lighting unit equipped with the optical system. In this case, the attachment can be designed in any way and can be designed and provided, for example, to meet aesthetic, optical, manufacturing or static tasks. For example, in the simplest embodiment, it can be a simple decorative ring. It can also be a designed lighting unit attachment. It can also be an attachment defining the light cone, for example. The attachment may also have optical features, such as a reflector. The attachment can also be made of a reflective material, for example.

The attachment may have one of the retaining sections. This is particularly suitable for the releasable variant. Thus, the structure of the optical system can be simplified overall. In this way, a light pattern can also be adapted in a particularly simple manner in that the optics carrier can be exposed and thus removed for adapting the optical elements by automatically removing the attachment together with the retaining section. On this occasion, the attachment can then be replaced as well, if required, and without additional assembly effort. After insertion of the optics carrier and placement (for example, screwing on) of the attachment together with the retaining section, the optical system is then ready for operation again.

The attachment can be provided on the optics carrier or, if present, on the system housing. The optical system is thus designed particularly simple and attaching the attachment is easy to accomplish.

The attachment can preferably releasable support an optical component (for example, a lens or a diffusing lens) such that the light passing through the attachment at least partially passes through the optical component to optically influence the light. The optical function of the optical system can thus be expanded with the attachment.

The optical system may have a fastening section on its side facing the light inlet opening for fastening the optical system to a lighting unit such that light from the lighting unit passes through the optical system along the longitudinal axis initially via the light inlet opening and then the light outlet opening. Thus, a simple fastening of the optical system to a lighting unit can be provided. Since furthermore said fastening is provided at a side facing the light inlet opening, a corresponding lighting unit can be provided in an optimized manner with respect to the optical system and preferably close to the light inlet opening. A particularly compact design can thus also be achieved.

The fastening section can be provided on the optics carrier or, if present, on the system housing. Thus, an overall particularly simple structure of the optical system can be provided.

The fastening section may preferably have a thread or a part of a bayonet connection for fastening the optical system preferably by relative rotation about the longitudinal axis. Thus, an equally intuitive and secure fastening of the optical system can be provided. Said optical system can also be operated intuitively by an operator and thus an incorrect installation can be reliably avoided.

The optical system can further preferably have at least one optical element, as has already been described above. In this case, the optical element is releasably inserted into one of the structural sections such that light coupled in via the light inlet opening and coupled out again via the light outlet opening passes at least partially and preferably completely through the optical element to optically influence the light. Preferably, the optical element extends transversely or perpendicular to the longitudinal axis over the entire receiving space to thus be arranged in a secure and defined manner in the light path. In any case, a corresponding optical element can thus be easily provided by means of the optical system in any desired and particularly simple manner for the defined setting of a desired light pattern.

The optical system may preferably have at least two optical elements which are each inserted in one of the structural sections such that, viewed axially with respect to the longitudinal axis, they are arranged at a distance from each other (that is to say with respect to the longitudinal axis in series with each other) in the receiving space such that light coupled in via the light inlet opening and coupled out again via the light outlet opening passes at least partially and preferably completely through the at least two optical elements to optically influence the light. A combination of optical elements can thus be provided in a simple manner and a light pattern can be varied in a defined manner by varying the relative axial distance thereof from each other as viewed in relation to the longitudinal axis.

The optical elements particularly preferably have an outer circumferential contour which corresponds to the contour of the optics carrier in the region of the structural sections. A defined alignment and a secure fit of the optical elements in the optics carrier can thus be ensured. A desired light pattern can thus be achieved particularly precisely and also maintained during the operating time.

The optical elements may be at least partially or continuously clamped radially around the outside with respect to the longitudinal axis A by the optics carrier to ensure a particularly firm and secure fit of the optical elements.

The optical elements can be selected from at least one of the group of lenses, such as Fresnel lenses, or diffusing lenses, such as diffuser lenses, and the like. By providing one or more arbitrary optical elements and this, moreover, at any distance from a light source on the one hand and, if a plurality of optical elements are present, in relation to each other, on the other hand, endless light emission characteristics or light patterns can be made possible by means of this optical system. This is all the more the case if an attachment provided at the light outlet opening is additionally provided with corresponding further optics components.

According to a further aspect, the present invention further relates to a lighting system with a lighting unit, such as preferably an LED Light (LED—Light Emitting Diode), and an optical system according to the present invention. The optical system is arranged in relation to the lighting unit and they are preferably connected to each other via the fastening section such that light from the lighting unit initially passes through the optical system via the light inlet opening and then the light outlet opening for light emission of the lighting system. By appropriately providing optical elements at arbitrary positions of the structural sections, any light pattern can thus be generated, which in turn can be adjusted in a particularly simple manner by exchanging or adjusting the optical elements in type and/or sequence and/or position with respect to the structural sections and thus the lighting unit.

The lighting unit can be any type of lighting unit which can be equipped with a corresponding optical system. For example, this can be a spotlight or spot lighting or a downlight and many more. Likewise, it can be a surface mounted light, recessed light, pendant light, floor lamp, table lamp and much more.

BRIEF DESCRIPTION OF THE DRAWINGS

Further embodiments and advantages of the present invention are described hereinafter with reference to the figures of the accompanying drawings. In the figures.

DETAILED DESCRIPTION OF THE EMBODIMENTS

Figure 1:
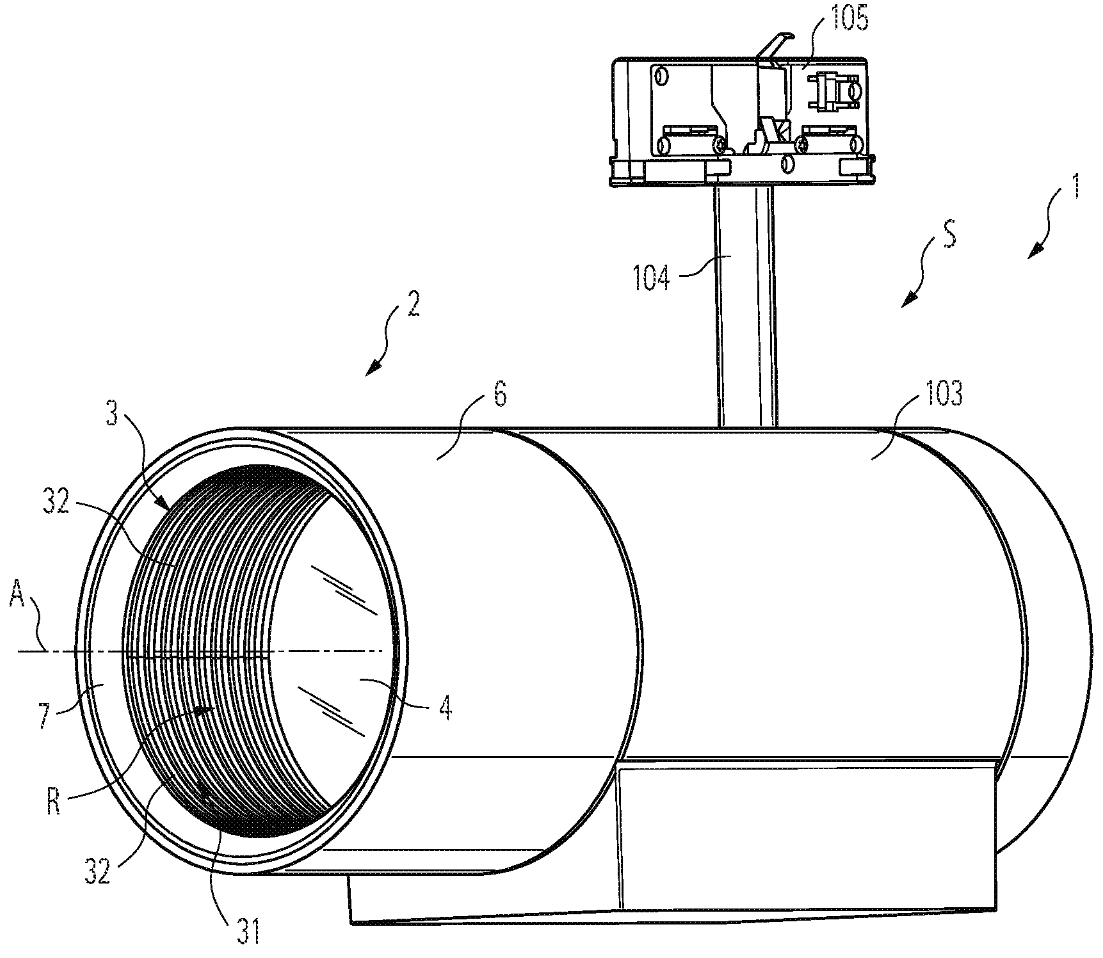
FIG. 1 shows a perspective view of a lighting system according to a first embodiment of the present invention.

The figures show two exemplary embodiments of a lighting system 1 according to the present invention or individual components thereof. In particular, FIGS. 1 to 3 and 6 show a lighting unit S as part of the lighting system 1. In FIGS. 1, 2, 4, 5 and 6, an optical system 2 of the lighting system 1 is shown (in FIG. 3 only a part of the same) also, which also represents an independent part of the present invention and is therefore described first in the following.

The optical system 2 for lighting units S has an optics carrier 3. Said optics carrier extends rectilinearly and preferably tubular or cylindrical along a longitudinal axis A between a light inlet opening LE and a light outlet opening LA. The optics carrier 3 thereby delimits a receiving space R between the openings LE, LA for receiving optical elements 4, 5. The optical elements 4, 5 can be, for example, a lens 4, such as a Fresnel lens, or a diffusing lens 5, such as a diffuser lens, and the like.

Figure 2:
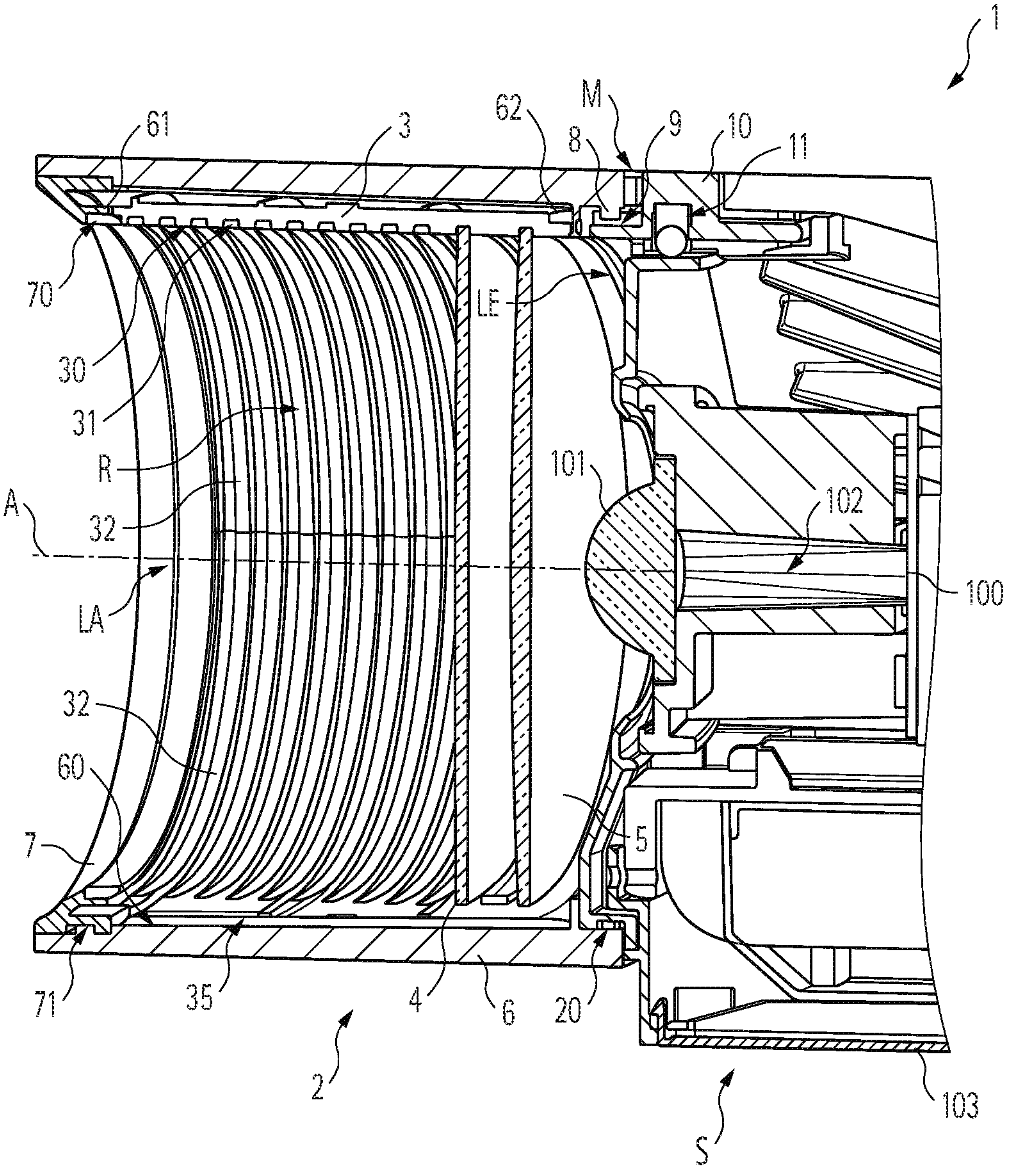
FIG. 2 shows a perspective sectional view of a part of the lighting system according to the invention according to FIG. 1.
Figure 4:
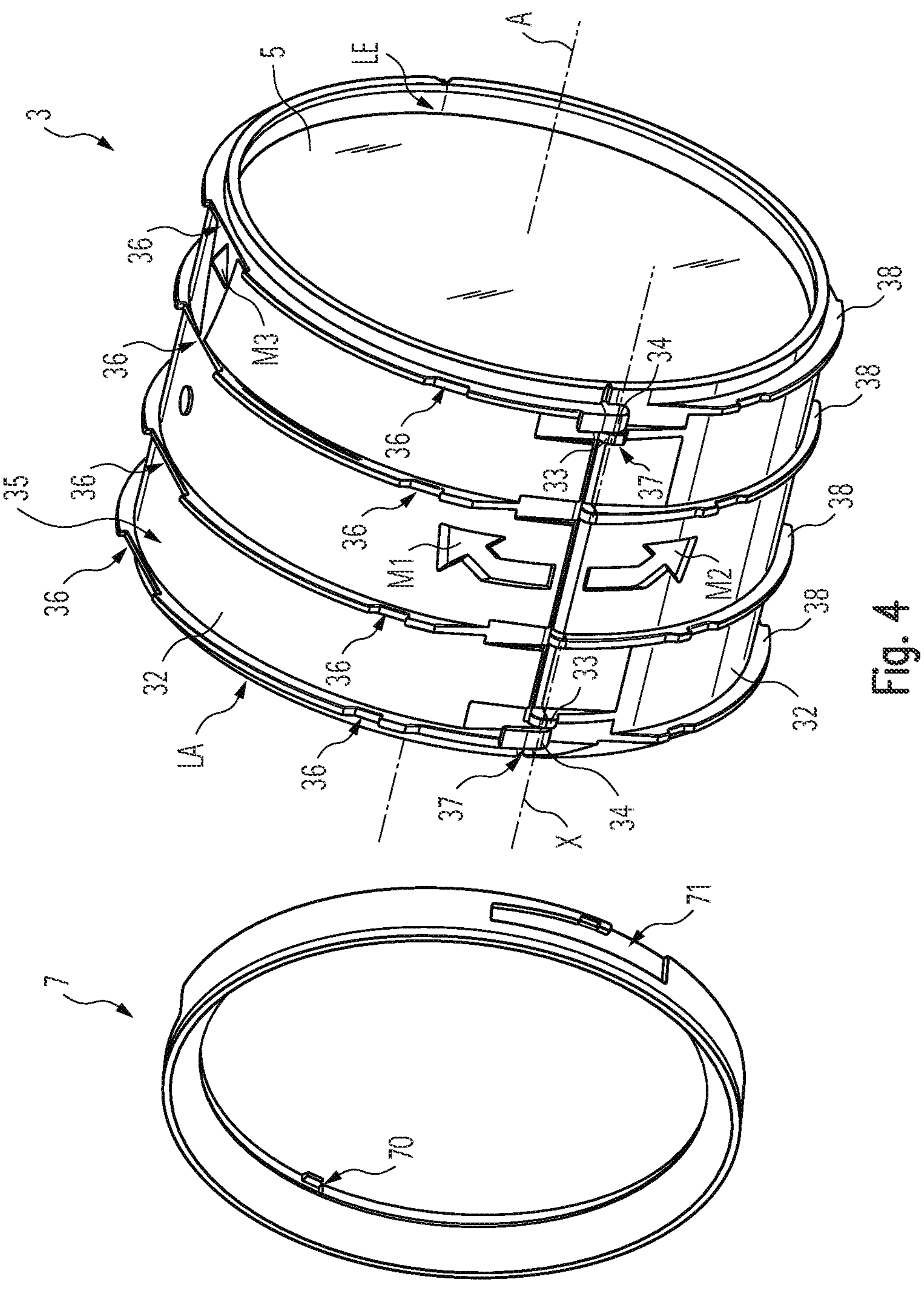
FIG. 4 shows a perspective view of an optics carrier with a removed retaining section or decorative ring of the lighting unit according to the invention according to FIG. 1.
Figure 5:
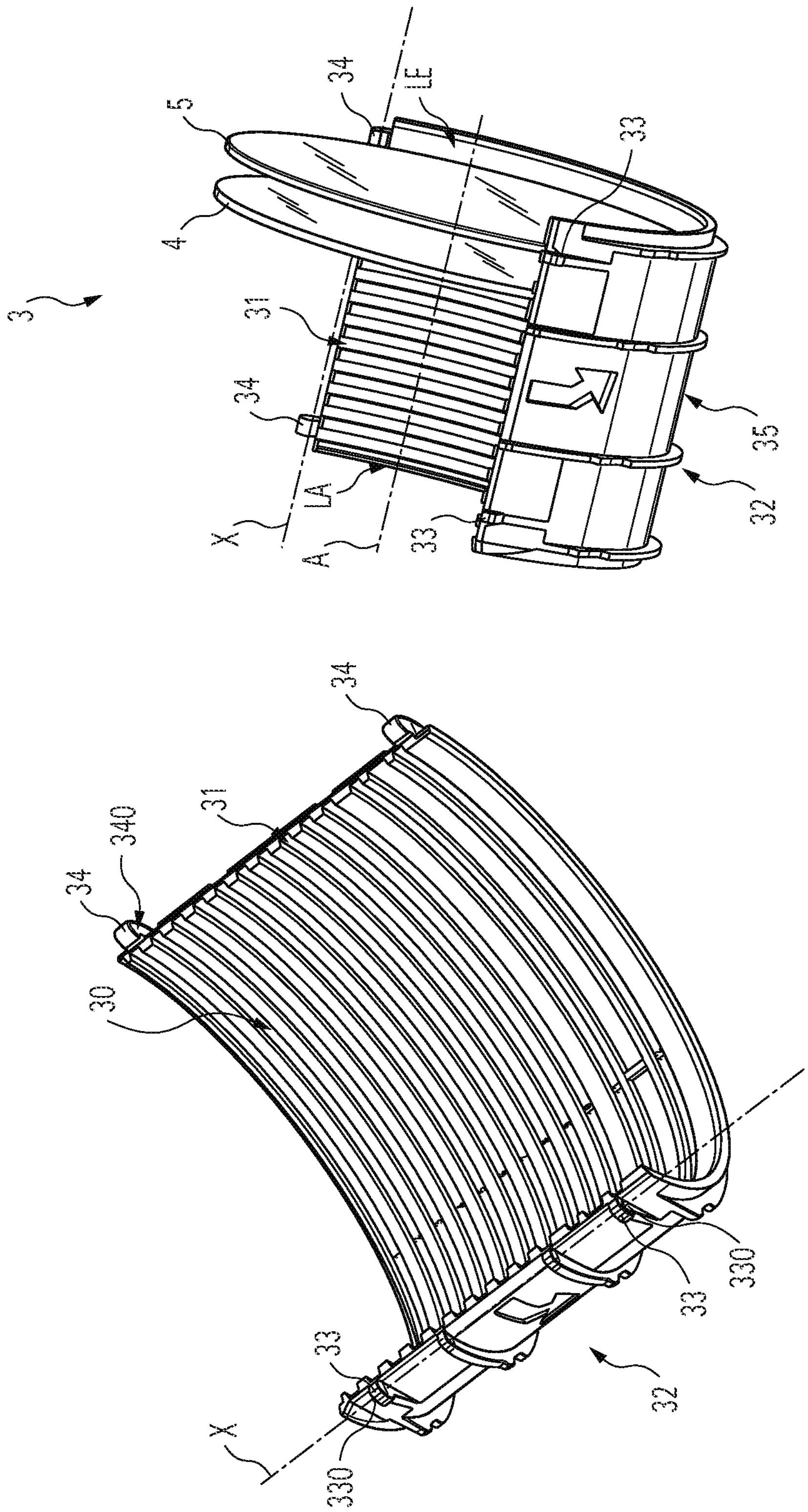
FIG. 5 shows a perspective view of the optics carrier according to FIG. 4 with its two sub-elements in the disassembled state and here two inserted optical.
Figure 6:
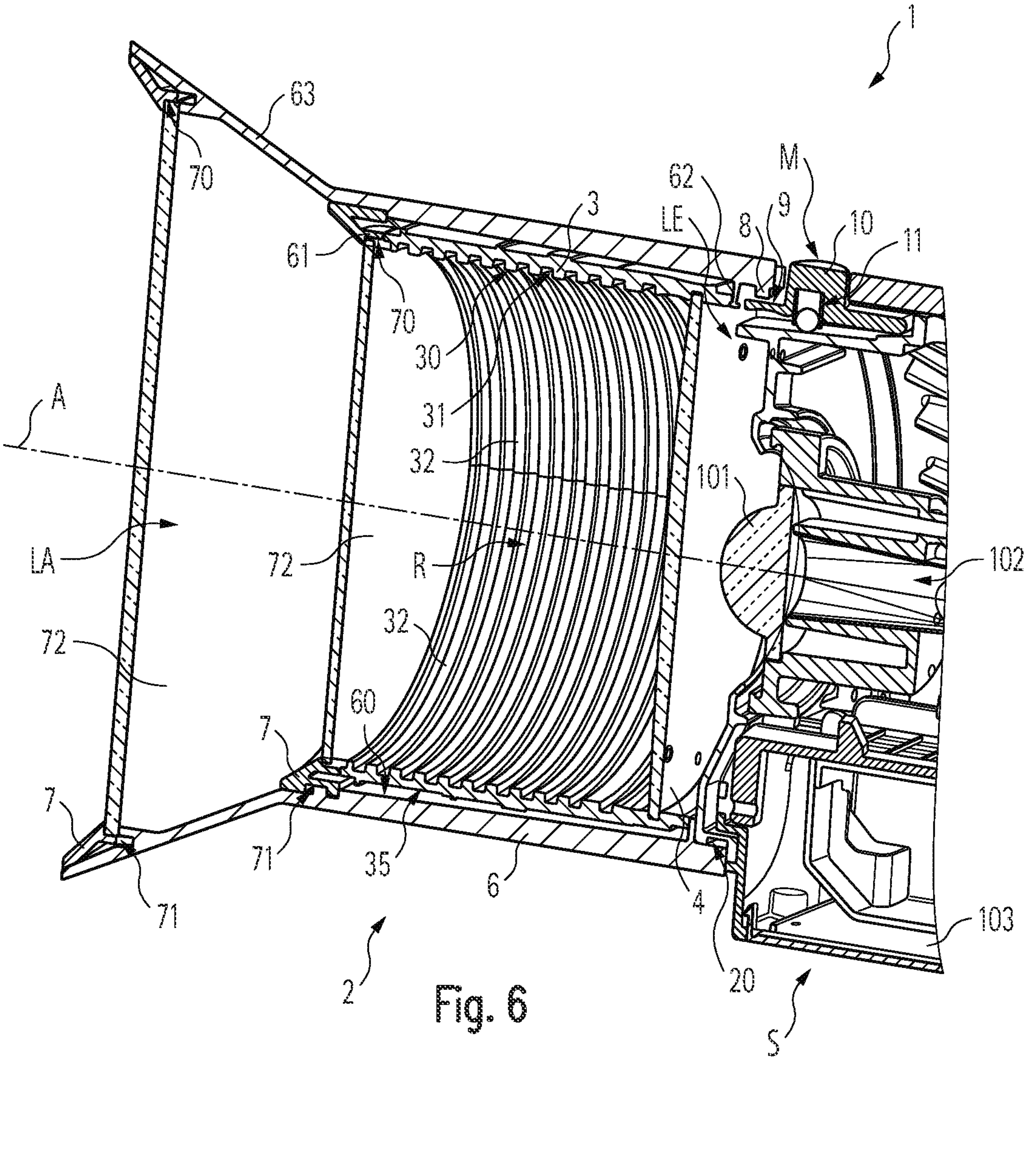
FIG. 6 shows a perspective sectional view of a part of a lighting system according to a second embodiment of the present invention.

As can be seen in particular from FIGS. 2, 4 and 6, an inner wall 30 of the optics carrier 3 facing the receiving space R may have at least two structural sections 31 arranged axially offset relative to each other with respect to the longitudinal axis A for releasably retaining an object element 4, 5 in the receiving space R. In the illustrated exemplary embodiments, a total of twelve such structural sections 31 are provided. These are also provided here with unique numbering (here 1 to 12; see FIG. 5) to ensure correct insertion of the optical elements 4, 5 at defined positions to achieve a desired light pattern.

The structural sections 31 can each be provided or extend circumferentially along the inner wall 30 and preferably in a plane perpendicular to the longitudinal axis A, and thus, as can be seen in FIGS. 2, 5 and 6, form uniform structures. The structural sections 31 can, as can be seen, for example, from FIG. 1, each extend around the longitudinal axis A. This can be made possible, for example, by providing the structural sections with structural regions distributed over the circumference or, as shown in the exemplary embodiment, by a circumferentially continuous structure. Thus, the structural sections 31 may have groove sections which are open radially relative to the longitudinal axis A towards the interior 30, as can be seen in particular from FIGS. 2, 5 and 6. As shown, the groove sections can be designed as ring grooves, which are preferably designed, as is the case here, circumferentially continuous around the longitudinal axis A. The structural sections 31 thus form a particularly secure receptacle for the optical elements 4, 5, as will be described below.

As can be seen, for example, from FIGS. 2, 5 and 6, the groove sections can widen radially with respect to the longitudinal axis A and towards the receiving space R. Consequently, the groove sections thus form a type of guide bevel to enable a particularly simple insertion of the optical elements 4, 5 and preferably likewise to take up any play between the optical element 4, 5 and the optics carrier 3.

As can be seen from FIGS. 2, 5 and 6, the structural sections 31 can be provided at least in part along the longitudinal axis A preferably equidistantly to thus enable a defined and uniform adjustment and thus positioning of the optical elements 4, 5 preferably to achieve a (preferably linear) change in a light emission characteristic.

As can be seen, in particular, from FIGS. 1 and 4, the optics carrier 3 can have a round cross section when viewed in the direction of the longitudinal axis A. Said round cross section is particularly easily produced. Other cross-sectional shapes are also conceivable, such as, for example, polygonal cross-sectional shapes of any kind such as, for example, quadrangular, pentagonal, hexagonal, octagonal, square, rectangular, etc.

As can be seen in FIG. 4, for example, the optics carrier 3 or, as can be seen in FIGS. 1, 2, 5 and 6, for example, at least the inner wall 30 of said optics carrier can be mirror-symmetrical with respect to a mirror plane having the longitudinal axis A. The optical elements 4, 5 can thus be received in a particularly simple manner and the optics carrier 3 can easily be produced.

As can be seen, in particular, from FIGS. 4 and 5, the optics carrier 3 can be composed of two or even more sub-elements 32. The sub-elements 32 can preferably be half-shell elements, s can be seen from FIG. 5. A separation plane of the optics carrier 3 for forming or separating the sub-elements 32 may preferably have the longitudinal axis A, as can be derived, for example, from FIGS. 4 and 5.

It can be seen, in particular, with reference to FIG. 5 that the sub-elements 32 are preferably designed identically. The production of the same and thus of the optics carrier 3 overall can thus take place particularly easily and with little tool use.

As can be seen in particular from the combination of FIGS. 4 and 5, the sub-elements 32 can each have coupling structures 33, 34 for connecting the sub-elements 32 to each other. Here, the coupling structures 33, 34 are preferably provided on an outer wall 35 of the optics carrier 3 facing away from the receiving space R. Thus, the coupling structures 33, 34 can be provided and configured outside the receiving space R that defines the light emission. The optical system can thus be designed functionally optimized without influencing the light emission characteristic.

By means of the coupling structures 33, 34, the sub-elements 32 can preferably be connected in a releasable and/or tool-free manner. In the exemplary embodiment shown here, the coupling structures 33, 34 consist of two coupling partners, wherein one of the coupling partners 33 has a projection or pin 330 projecting parallel to the longitudinal axis A. As can be seen from FIG. 5, two corresponding projections 330 directed away from one another are provided here on each side. Here, the coupling partner 34 corresponding thereto has a corresponding recess 340 which is likewise directed along the longitudinal axis A and which, corresponding to the projections 330, are present twice and in an axially spaced manner. The two sub-elements 32 are then rotated and guided relative to each other in such a way that the corresponding coupling partners of the coupling structures 33, 34 fit together to form the closed ring shape of the optics carrier 3, as shown in FIG. 4. For this purpose, the pins 330 snap into the corresponding recesses 340. A secure connection of the sub-elements 32 is achieved by the spaced apart and opposite alignment of these coupling structure partners 33, 34.

The sub-elements 32 can particularly preferably be connected to each other in an articulated manner about a pivot axis X via an articulated section 37 to pivot the sub-elements 32 relative to each other and thus selectively expose the receiving space R for inserting the optical elements 4, 5 into the structural sections 31. For example, the interacting coupling structures 33, 34 may then be provided on the sides opposite the articulated sections 37, which are brought together when the sub-elements 32 are pivoted back for closing the optics carrier 3.

In a particularly preferred embodiment, it is conceivable that the coupling structures 33, 34, as shown, simultaneously have the articulated section 37. Designing the connection so that the projection 330 and the recess 340 are being braced against each other is particularly suitable here. The pivot axis X here particularly preferably runs parallel to the longitudinal axis A, as is shown by way of example in the present exemplary embodiment of FIGS. 4 and 5.

Marks M1, M2 on the sub-elements 32 can assist the operator in the correct disassembly and assembly of the sub-elements 32 for inserting or replacing the optical elements 4, 5.

The optics carrier 3 or its sub-elements 32 can be produced as an injection-molded part. In particular, the multi-part design of the optics carrier 3 in a plurality of sub-elements 32 shown here is particularly preferable here for production as an injection molded part, since this enables a simple and preferably non-destructive demolding after the injection molding process, so that corresponding tools can be used to producing numerous sub-elements 32. The use of identical parts for the sub-elements 32 for forming the optics carrier 3 further contributes to increased cost efficiency.

As can be seen in particular from FIGS. 1 to 3 and 6, the optical system preferably further has a system housing 6 for receiving the optics carrier 3. As can be seen in particular from FIGS. 2 and 6, the system housing 6 circumferentially surrounds the optics carrier 3 at least partially on the outer side. As can be seen from FIGS. 2 and 6, the system housing 6 completely receives the optics carrier 3 here. The optics carrier 3 can thus be used and inserted in the manner of a cartridge. Thus, the optics carrier 3 can preferably be provided so as to be insertable into the system housing 6 along the longitudinal axis A, which enables a particularly simple assembly. With reference to FIGS. 3 to 6, the system housing 6 on the one hand and the optics carrier 3 on the other hand may have corresponding connecting structures 36, 66 on the sides 35, 60 which face each other. These connecting structures 36, 66 can guide the optics carrier 3 during insertion along the longitudinal axis A relative to the system housing 6 and preferably prevent the components (i.e., the system housing 6 and the optics carrier 3) from rotating relative to each other about the longitudinal axis A. Also, with asymmetrical distribution of the connecting structures 36, 66 or different design of the same (both shown in the illustrated embodiment), incorrect installation can be avoided or a single defined installation orientation can be made possible. Marks M6, M3 on the system housing 6 on the one hand, and the optics carrier 3 on the other hand, facilitate the correct orientation of the components 3, 6 relative to each other and thus a quick and secure assembly.

The optics carrier 3 and, in particular its sub-elements 32, may have circumferential webs 38. On the one hand, these can give the optics carrier 3 a high dimensional stability even with a small wall thickness. On the other hand, these webs 38 can serve to provide the previously described connecting structures 36 by means of corresponding recesses, as can be seen in particular from FIG. 4. The or part of the coupling structures 33, 34 can also be provided integrated in the webs 38.

As can be seen in particular from FIGS. 2 and 6, here preferably at the ends of the optics carrier 3 that are axially opposite with respect to the longitudinal axis A, the system housing 6 may have two retaining sections 61, 62 which retain the optics carrier 3 axially therebetween and preferably clamp it therebetween. A secure positioning of the optics carrier 3 with respect to the longitudinal axis A, when viewed axially, can thus be made possible.

One of the retaining sections, here preferably the retaining section 61 facing the light outlet opening LA, can be releasably provided on the system housing 6. In principle, of course, both of the retaining sections 61, 62 can also be provided releasably. To achieve this, the releasable retaining section 61 can be formed in the form of a ring 7 which can be screwed on by means of a bayonet connection 71, as can be seen in FIGS. 1, 2, 4 and 6.

The optical system 2 may further have an attachment 7 which is preferably releasably provided on the side facing the light outlet opening LA, such that light emitted via the light outlet opening LA passes through the attachment 7 for light emission of the lighting unit S. This attachment 7 can be the above-described ring 7, shown, for example, in FIGS. 4 and 6. Into this attachment or ring 7, an optical component 72 (cf. FIG. 6; similar or identical to the optical elements 4, 5) can be releasably clipped via retaining structures 70, for example, or clamped axially together with the optics carrier 3, for example, on the side facing the light entry opening LE, to thus further influence the light emission characteristics of the lighting unit S.

The system housing 6 according to the exemplary embodiment of FIG. 6 has a flared light emission section 63 on the side of the light outlet opening LA. This is formed integrally with the system housing 6 here. It is also conceivable that this light emission section 63 is designed to be releasable, for example as part of a separate attachment 7. The system housing 6 preferably has a (further) attachment 7, which is visually downstream of the optics carrier 3 here (and in the present case also of the above-described attachment 7), that is to say as viewed in extension with respect to the longitudinal axis A. Said attachment is provided here from the front on the distal end of the light emission section 63 and is preferably pushed on or also screwed onto the system housing 6—here via a receiving section 64—via a preferably releasable connection 71. This attachment 7 carries a further optical component 72 to influence the light emission characteristic of the lighting unit S even further, if necessary. The optical component 72 is preferably also releasably clipped on via retaining structures 70, for example onto the attachment 7, or is axially clamped together with the system housing 6 (here, for example, via the receiving portion 64).

The attachment 7 can simply be a decorative ring which enables an aesthetically pleasing termination of the optical system 2 on the front. However, the attachment 7 can also be any other attachment 7, which preferably also influences the optical light emission characteristic. Said attachment then may have further optical components 72 (for example lenses and/or diffusing lenses) in any desired manner. For this purpose, the attachment 7 can, as already described, carry the optical component(s) 72 in a preferably releasable manner so that the light passing through the attachment 7 at least partially pass through said optical component 72, or even several optical components 72 (cf. FIG. 6), preferably provided axially in series with respect to the longitudinal axis A, to optically influence the light.

As can be seen in particular from the illustration in FIGS. 2 and 6 and as has already been described above, the attachment 7 or one of the attachments 7 (here the attachment 7 provided adjacent to the optics carrier 3 in FIGS. 2 and 6) may preferably have one of the retaining sections 61. This retaining section 61 is formed integrally with the ring 7. By screwing on this attachment 7, the retaining section 61 can thus be positioned accordingly to thus ultimately retain or clamp the optics carrier 3 between this retaining section 61 and the other retaining section 62.

The attachment 7 may be provided on the optics carrier 3 or, as shown, on the system housing 6, for example, by means of a connection 71 that is rotatable about the longitudinal axis A or otherwise releasable, such as the bayonet connection 71 shown here, or even by pushing it on, for example, along the longitudinal axis A, according to the push-on connection 71 shown in FIG. 6. The attachment 7 can be used to either simply form an aesthetically pleasing termination of the optical system 2 or to provide additional optical functions in the form of further optical components 72 downstream in the light emitting direction. Thus, the variability of the optical system 2 can overall be further increased.

The optical system 2 may have a fastening section 20 on its side facing the light inlet opening LE for fastening the optical system 2 to the lighting unit S. This is preferably such that light from the lighting unit S passes through the optical system 2 along the longitudinal axis A initially via the light inlet opening LE and then the light outlet opening LA. The fastening section 20 can be provided on the optics carrier 3 or, as shown, on the system housing 6.

The fastening section 20 may preferably have a thread or a part of a bayonet connection for fastening the optical system 2 preferably by relative rotation about the longitudinal axis A. To avoid an unintentional release of the optical system 2 from the lighting unit S, a locking mechanism M may be provided which, in the locking position, locks the optical system 2 on the one hand and, on the other hand, locks the lighting unit S about the axis of rotation A. For this purpose, one of the optical system 2 and the lighting unit S (here the optical system 2) may have a latching projection 8 projecting radially inward and the other of the optical system 2 and the lighting unit S (here the lighting unit S) may have a latching recess 9 which is open toward the outside and towards the latching projection 8 in the illustrated locking position. Said latching recess and latching projection snap into the locking position in such a way that a relative rotation of the optical system 2 and the lighting unit S around the longitudinal axis A and thus the release of the components from each other is prevented. The locking mechanism M is preferably designed for releasable locking. In the embodiment shown here, for example, the latching recess 9 can be part of a release lever 10 for this purpose, which here is forced radially outward into the locking position with the latching projection 8 by means of a spring element 11.

As already described above, the optical system 2 has at least one or even several optical elements 4, 5. As can be seen in particular from FIGS. 2, 5 and 6, each optical element 4, 5 can be, or is, releasably inserted into one of the structural sections 31 so that light coupled in via the light inlet opening LE and again coupled out via the light outlet opening LA passes at least partially through the optical element(s) 4, 5 to optically influence the light, as can be seen in particular from the sectional view of FIGS. 2 and 6. In FIG. 6, only one optical element 4 is provided by way of example. If several optical elements 4, 5 are provided, as is shown by way of example in FIG. 2, these are each inserted into one of the structural sections 31, so that they are arranged in the receiving space R axially spaced apart from each other with respect to the longitudinal axis A, i.e., axially in series with respect to the longitudinal axis A, such that light coupled in via the light inlet opening LE and coupled out again via the light outlet opening LA passes at least partially and preferably completely through the at least two optical elements 4, 5 to optically influence the light.

As can be seen in particular from FIGS. 2, 5 and 6, the optical elements 4, 5 may have an outer circumferential contour which corresponds to the contour of the optics carrier 3 in the region of the corresponding structural section 31. A particularly secure and firm fit of the optical elements 4, 5 in the optics carrier 3 can thus be made possible.

In a particularly preferred embodiment, the optical elements 4, 5 may be at least partially or continuously clamped radially around the outside with respect to the longitudinal axis A by the optics carrier 3 (i.e., its associated structural section 31).

FIGS. 1, 2 and 6 show a lighting system 1 with a lighting unit S and an optical system 2 according to the invention. The optical system 2 is arranged with respect to the lighting unit S in such a way and these are preferably connected to each other via the fastening section 20 in such a way that light from the lighting unit S first passes through the optical system 2 via the light inlet opening LE and then through the light outlet opening LA to emit light from the lighting system 1. This can be seen in particular from FIGS. 2 and 6. As a result of the above-described variable arrangement of the optical elements 4, 5, which in the installed state are then inevitably also passed through by the light from the lighting unit S, a desired light pattern can thus be produced in a particularly simple manner and adapted or changed as required. As can be seen by way of example from FIG. 6, the lighting unit 1 can be further optically optimized with further optical components 72.

As can be seen from the combination of FIGS. 2 and 6, these exemplary embodiments differ here only in the design of the system housing 6. The optics carrier 3 is preferably identical so that it can easily be used as a kind of cartridge in any embodiment. Depending on the intended use, the position, number and type of optical elements 4, 5 can then be easily adapted. Further optics components 72 can also be provided if necessary.

The lighting unit S is shown here in the form of a spot light, although the invention is not limited to a specific type of lighting unit.

Figure 3:
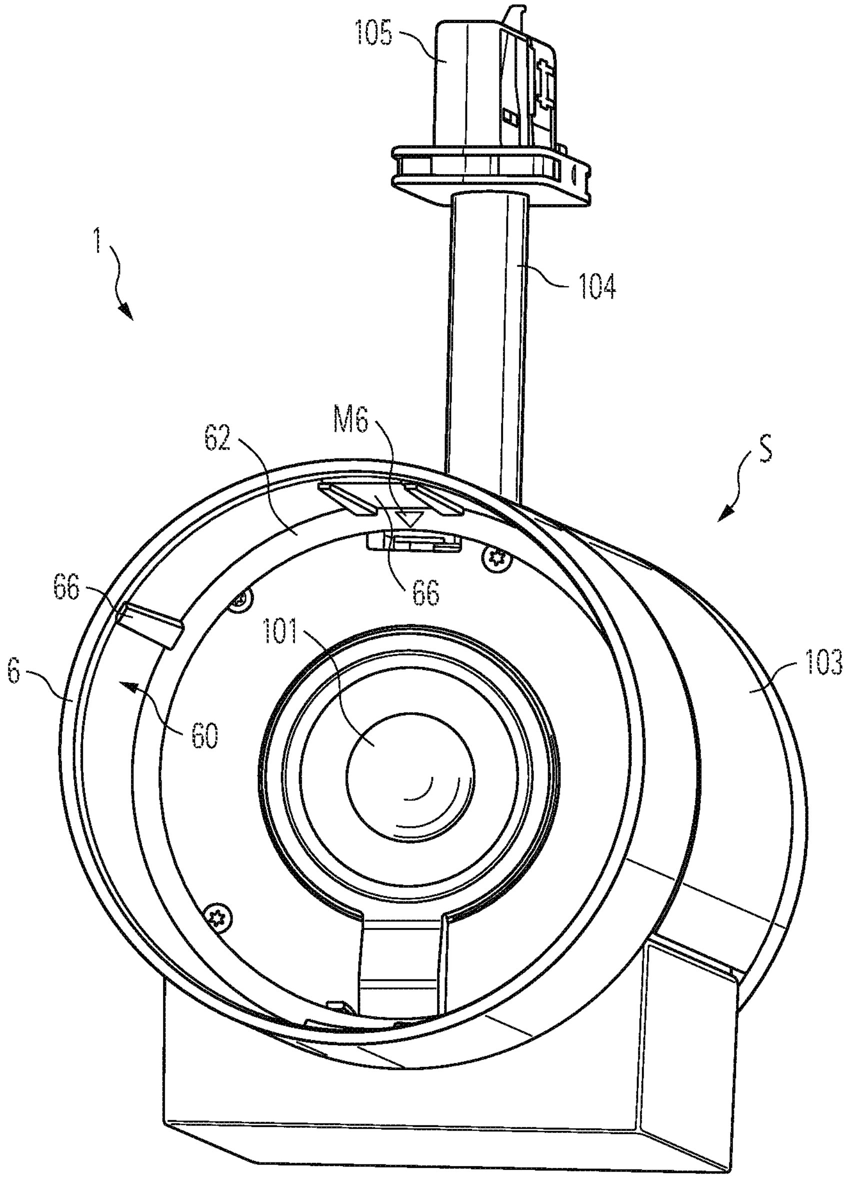
FIG. 3 shows a perspective front view of a lighting unit with a system housing of the lighting system according to the invention according to FIG. 1.

As can be seen, for example, from FIGS. 2 and 3 and in part also FIG. 6, the lighting unit S is designed as an LED light. Thus, the lighting unit S here has an LED module 100 as an illuminant, which here has an LED or an LED cluster as a light source, preferably arranged on a circuit board. An optical means in the form of a lens 101 is provided downstream of the LED module 100 in the light emission direction for emitting the light from the lighting unit S in the desired manner into the optical system 2. Here, a mixing chamber 102 for the homogeneous mixing of the light emitted by the LED module 100 is provided between the LED module 100 and the lens 101 to thus produce a particularly homogeneous light output. In principle, however, any known illuminants are conceivable. For example, the LED illuminant can also be combined with a reflector or a light-directing component for defined light emission.

The illuminant 100 is preferably arranged in a lighting unit housing 103. In this case, the lighting unit housing 103 can be designed in the form of a (movable) lighting unit head which can be mounted pivotably, for example, via a pivot arm 104. At the end of the pivot arm 104 facing away from the lighting unit housing 103, said pivot arm has a coupling section 105 for the electrical and preferably also mechanical connection of the lighting system 1 or the lighting unit S. The coupling section 104 is designed here such that it can be inserted, for example, into an elongate lighting unit support rail and can be coupled to it electrically and/or mechanically. The pivot arm 104 is preferably designed to be hollow in order to guide electrical conductors therein for operating the lighting system 1 or the lighting unit S.

The present invention is not limited by the exemplary embodiment described above, provided it is covered by the subject matter of the following claims. The features described above can be arbitrarily combined and interchanged and replaced.

The invention claimed is:

1. An optical system (2) for lighting units comprising:

an optics carrier (3) which extends rectilinearly between a light inlet opening (LE) and a light outlet opening (LA) along a longitudinal axis (A) and delimits a receiving space (R) between the openings (LE, LE) for receiving optical elements (4, 5), wherein an inner wall (30) of the optics carrier (3) facing the receiving space (R) has at least two structural sections (31) arranged axially offset relative to each other with respect to the longitudinal axis (A) for releasably mounting an optical element (4, 5) in the receiving space (R);

at least two optical elements (4, 5), each of which is inserted into one of the structural sections (31), so that they are axially arranged spaced apart from each other, viewed axially with respect to the longitudinal axis (A), in the receiving space (R), such that light coupled in via the light inlet opening (LE) and coupled out again via the light outlet opening (LA) at least partially passes through the at least two optical elements (4, 5) to optically influence the light;

wherein the optical elements (4, 5) are a Fresnel lens and a diffuser lens (5).

2. A lighting system (1) having an LED lighting unit(S) and an optical system (2) as recited in claim 1, wherein the optical system (2) is arranged relative to the lighting unit(S), said optical system and said lighting unit are connected to each other via a fastening section (20) such that light from the lighting unit(S) initially passes through the optical system (2) via the light inlet opening (LE) and then the light outlet opening (LA) for the lighting system (1) emitting light.

3. The lighting system according to claim 2, wherein the structural sections (31) are each provided circumferentially along the inner wall (30) and in a plane perpendicular to the longitudinal axis (A).

4. The lighting system according to claim 2, wherein the structural sections (31) each have groove sections extending around the longitudinal axis (A) and open radially with respect to the longitudinal axis (A) towards the receiving space (R).

5. The lighting system according to claim 4, wherein the groove sections are designed as ring grooves which are formed continuous around the longitudinal axis (A).

6. The lighting system according to claim 4, wherein the groove sections widen radially with respect to the longitudinal axis (A) and towards the receiving space (R).

7. The lighting system according to claim 2, wherein the structural sections (31) are provided equidistantly at least in part along the longitudinal axis (A).

8. The lighting system according to claim 2, wherein the optics carrier (3), at least its inner wall (30), is mirror-symmetrical with respect to a mirror plane having the longitudinal axis (A).

9. The lighting system according to claim 2, wherein the optics carrier (3) is composed of two sub-elements (32), wherein a parting plane has the longitudinal axis (A).

10. The lighting system according to claim 9, wherein the sub-elements (32) are identical.

11. The lighting system according to claim 9, wherein the sub-elements (32) each have coupling structures (33, 34), on an outer wall (35) of the optics carrier (3) facing away from the receiving space (R) for connecting the sub-elements (32) to each other, releasably and/or without tools.

12. The lighting system according to claim 9, wherein the sub-elements (32) are articulated to each other about a pivot axis (X) via an articulated section (37) for pivoting the sub-elements (32) relative to each other and thus selectively expose the receiving space (R) for inserting the optical elements (4, 5) into the structural portions (31).

13. The lighting system according to claim 11 wherein the coupling structures (33, 34) have the articulated section (37).

14. The lighting system according to claim 12, wherein the pivot axis (X) extends parallel to the longitudinal axis (A).

15. The lighting system according to claim 2, wherein the optics carrier (3) is produced from injection-molded plastic.

16. The lighting system according to claim 2, further having a system housing (6) for receiving the optics carrier (3) which system housing surrounds the optics carrier (3) circumferentially on the outside.

17. The lighting system according to claim 16, wherein the optics carrier (3) is insertable into the system housing (6) along the longitudinal axis (A).

18. The lighting system according to claim 17, wherein the system housing (6) and the optics carrier (3) have connecting structures (36, 66) corresponding to the sides (35, 60) facing each other, which connecting structures guide the optics carrier (3) along the longitudinal axis (A) relative to the system housing (6) during insertion and prevent said optics carrier and said system housing from rotating relative to each other about the longitudinal axis (A).

19. The lighting system according to claim 2, wherein the system housing (6) has two retaining sections (61, 62) which are axially opposite with respect to the longitudinal axis (A), which retain and the optics carrier (3) axially therebetween.

20. The lighting system according to claim 19, wherein one of the retaining sections (61, 62) is releasably provided on the system housing (6).

21. The lighting system according to claim 2, further having an attachment (7) which is releasably provided at the side facing the light outlet opening (LA) such that light emitted via the light outlet opening (LA) passes through the attachment (7) for light emission by the lighting unit(S).

22. The lighting system according to claim 2, wherein the fastening section (20) has a thread or a part of a bayonet connection in order to fasten the optical system (2) by relative rotation about the longitudinal axis (A).

23. The lighting system according to claim 2, wherein the optical elements (4, 5) have an outer circumferential contour which corresponds to the contour of the optics carrier (3) in the region of the structural sections (31).

24. The lighting system according to claim 2, wherein the optical elements (4, 5) are at least partially or continuously clamped radially in relation to the longitudinal axis (A) around the outside, by the optics carrier (3).

25. The optical system (2) according to claim 1 wherein the diameter of the Fresnel lens is substantially the same as the diameter of the diffuser lens.

* * * * *